United States Patent
Deakin (10) Patent No.: US 12,213,507 B2
(45) Date of Patent: Feb. 4, 2025

(54) SYSTEM AND METHOD FOR FLAKING

(71) Applicant: Chris Deakin, Spearman, TX (US)

(72) Inventor: Chris Deakin, Spearman, TX (US)

( * ) Notice: Subject to any disclaimer, the term of this patent is extended or adjusted under 35 U.S.C. 154(b) by 0 days.

(21) Appl. No.: 17/573,457

(22) Filed: Jan. 11, 2022

(65) Prior Publication Data

US 2022/0125080 A1 Apr. 28, 2022

Related U.S. Application Data

(63) Continuation of application No. 16/365,620, filed on Mar. 26, 2019, now Pat. No. 11,246,330.

(60) Provisional application No. 62/622,505, filed on Jan. 26, 2018.

(51) Int. Cl.

| | | |
|---|---|---|
| *G01N 9/02* | (2006.01) | |
| *A23L 7/117* | (2016.01) | |
| *B02B 1/04* | (2006.01) | |
| *B02B 1/08* | (2006.01) | |
| *B02B 3/04* | (2006.01) | |
| *B02B 7/00* | (2006.01) | |
| *B02B 7/02* | (2006.01) | |
| *B02C 4/06* | (2006.01) | |
| *B02C 4/28* | (2006.01) | |
| *B02C 4/38* | (2006.01) | |
| *B02C 9/04* | (2006.01) | |
| *B02C 11/04* | (2006.01) | |
| *B02C 23/02* | (2006.01) | |
| *A23N 17/00* | (2006.01) | |

(52) U.S. Cl.
CPC ................ *A23L 7/117* (2016.08); *B02B 1/04* (2013.01); *B02B 1/08* (2013.01); *B02B 3/045* (2013.01); *B02B 7/00* (2013.01); *B02B 7/02* (2013.01); *B02C 4/06* (2013.01); *B02C 4/286* (2013.01); *B02C 4/38* (2013.01); *B02C 9/04* (2013.01); *B02C 11/04* (2013.01); *B02C 23/02* (2013.01); *G01N 9/02* (2013.01); *A23N 17/005* (2013.01); *A23V 2300/24* (2013.01); *A23V 2300/31* (2013.01); *G01N 2009/024* (2013.01)

(58) Field of Classification Search
CPC .... B02C 4/32; B02C 4/38; B02C 9/00; B02C 9/02; B02C 9/04; B02C 11/04; B02C 4/286; B02B 3/045; B02B 7/02
USPC ...................................................... 241/6–12
See application file for complete search history.

(56) References Cited

U.S. PATENT DOCUMENTS

| | | | | |
|---|---|---|---|---|
| 4,442,980 A | * | 4/1984 | Oetiker .................. | B02C 4/286 241/34 |
| 6,586,028 B1 | * | 7/2003 | Brown .................. | A23K 10/30 426/511 |
| 6,863,913 B1 | * | 3/2005 | Navin ...................... | B65B 1/44 141/105 |

(Continued)

FOREIGN PATENT DOCUMENTS

DE 19548558 A1 * 6/1997 ............... B02C 4/32

*Primary Examiner* — Jared O Brown
(74) *Attorney, Agent, or Firm* — Braxton Perrone, PLLC; Bobby W. Braxton; Gregory Perrone (57) ABSTRACT

A system and method for flaking. The system includes a stationary roller, and moveable roller, and an adjustable fixator applying tension between the stationary and moveable rollers. The fixator includes a pressure transducer and a linear indicator. The transducer and indicator allow the fixator to read pressures and make fine adjustments to the fixator to obtain a desired gap between the two rollers.

5 Claims, 8 Drawing Sheets

(56) References Cited

U.S. PATENT DOCUMENTS

| | | | |
|---|---|---|---|
| 2006/0081179 A1* | 4/2006 | Ueberschar | D21F 3/06 |
| | | | 118/248 |
| 2009/0087523 A1* | 4/2009 | Freeman | A23L 7/10 |
| | | | 426/233 |

\* cited by examiner

SYSTEM AND METHOD FOR FLAKING

PRIORITY

The present invention is a continuation of Non-Provisional application Ser. No. 16/365,620 filed Mar. 26, 2019, which claims priority to Provisional U.S. 62/622,505 filed Jan. 26, 2018, the entirety of which is hereby incorporated by reference.

BACKGROUND OF THE INVENTION

Technical Field

The present invention relates to a system and method for flaking.

Description of Related Art

A flaking operation converts corn into corn flakes which can be used to feed livestock, such as cattle. However, to date the flaking operation requires constant monitoring and manual adjustments. Consequently, there is a need for an improved flaking system and method.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
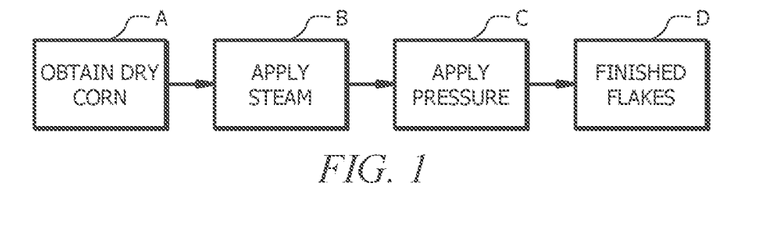
FIG. 1 is a schematic flow chart of the method of making flakes in one embodiment.

FIG. 1 is a schematic flow chart of the method of making flakes in one embodiment. This process is simplified for explanatory purposes. First, the process starts with obtaining corn. The moisture content of the obtained corn will depend upon a variety of factors including the location of the corn, the time of the year, etc. Corn which has been obtained closer to harvesting time will have a higher moisture content than corn which has been stored in a storage container for several months. The dry corn can having a moisture content which ranges from about 10% to about 16% by weight.

After obtaining the dry corn, steam is applied to heat and wet the corn to a desired temperature and moisture content. The desired moisture content can depend upon the desired content of the final flakes, but the moisture content typically ranges between about 18-20% by weight.

Like the moisture content, the desired temperature can also vary depending upon the desired characteristics of the final flakes. In one embodiment sufficient steam and/or heat is added to gelatinize the corn. A gelatinized corn results in a product which can be more efficiently digested by livestock. In one embodiment the corn is heated to a temperature of about 210° F.

In one embodiment, samples are taken periodically to measure moisture content and temperature. In one embodiment these samples are taken continuously. In some embodiments these samples are taken in-line. The samples are analyzed to determine the moisture content of the product entering the rollers. A Program Logic Controller (PLC) can then direct valves to increase or decrease the amount of steam which is added during the steam application step b.

In some embodiments this process is automated. This is an advantage as it does not require constant monitoring and manual adjustments. In previous attempts, the moisture content of either the final flakes or the product entering the rollers was obtained. If the moisture content was too high, then the steam was manually decreased by reducing the flow of steam. If a subsequent analysis showed that the moisture content was too low, then the steam valve was manually opened. With product feed inconsistencies, the operator was constantly chasing the desired moisture content by manually opening and closing steam valves.

As noted, in one embodiment, the moisture content of the product exiting the steam mixer and/or the moisture content of the final flakes is obtained. Thereafter, the amount of steam added in step b is automatically calibrated to yield a desired moisture content. If the moisture content is too high, then the amount of steam is reduced. This occurs automatically via computer monitoring, PLC, and adjustable and automated control valves.

One benefit of an automated moisture content control is the ability to produce more uniform and consistent flakes with the desired moisture content. Further, by closely monitoring and controlling moisture content, changes in other variables such as feed rate, or moisture content of the dry corn can be better tolerated and compensated.

After heating and wetting the corn to the desired moisture content, the hot and wet corn is delivered to the roller system where pressure is applied via the rollers. This process applies pressure and sets the thickness of the final flake. The thickness of the final flake effects many of the final characteristics of the final flake, including density.

One metric in ensuring a uniform and consistent flake is obtained is density. Density is weight per volume. If a uniform density is obtained, then this ensures that the flakes are being flaked in a uniform fashion. Conversely, if a non-uniform density is obtained, then an adjustment needs to be made to either the feed rate, the rollers, etc.

FIG. 2 shows a variety of views of the density analyzer in one embodiment. In one embodiment the density analyzer is an automated sample collection and testing system which provides accurate flake density analysis. The density analyzer, in one embodiment, comprises a Human Machine Interface (not depicted), which allows an operator to set the sample interval collection as well as the desired density. Thereafter, the unit will automatically collect and analyze a precise sample for one or more of a set of rollers.

FIG. 2 shows the density analyzer 201. For simplification purposes much of the support equipment has not been illustrated. The analyzer 201 comprises a product inlet 202. The product inlet 202 is downstream of the flaker. As used herein, upstream and downstream refer to relative locations in a process. As an example, obtaining dry corn in step a is upstream of applying steam in step b. As noted, the inlet line 202 is in fluid communication with at least one flaker. Thus, as finished flakes exit the rollers, discussed in more detail below, samples are periodically pulled and delivered to the inlet line 202.

In one embodiment, the inlet line 202 is fluidly coupled to both the left side and the right side of a single pair of rollers of a flaker. Often a single flaker has a pair of rollers, a left side, and a right side, connected by an axel. Flakes can be made from both the left side of the rollers and the right side of the rollers. In one embodiment, discussed herein below, the left and right side of the rollers can be independently adjusted. Consequently, in one embodiment the analyzer 201 will pull a sample from the left side of a first flaker, analyze the sample, and then pull and analyze a sample from the right side of the first flaker.

Additionally, in some embodiments the analyzer 201 can be in fluid communication with more than one flaker. As an example, in one embodiment the analyzer 201 is in communication with a first flaker and a second flaker. Thus, the analyzer 201 can pull and analyze a sample from the left side of the first flaker, thereafter pull and analyze a sample from the right side of the first flaker, and then pull and analyze a sample from the left side of the second flaker, and then finally pull and analyze a sample from the right side of the second flaker. Those skilled in the art will understand the logic and process controls necessary to fluidly connect the analyzer 201 to receive samples from a plurality of flakers. As an example, a controller will open and close the necessary valves to ensure the analyzer 201 receives the sample from the desired side of the rollers from the desired flaker. Thus, in one embodiment the analyzer 201 receives samples from more than one flaker.

The time and sequence of the samples directed to the analyzer 201 can depend upon the operation. In one embodiment, for example, the analyzer 201 pulls and samples one side of a flaker every 5 to 15 minutes.

The operation of the analyzer 201 will be now be described in reference to FIG. 2. As noted, the analyzer 201 receives product through inlet line 202. The product can be directed into the analyzer 201 via any method known in the art for moving flakes including pumping, augers, etc. In one embodiment, and as depicted, the analyzer 201 creates a vacuum which pulls product into the analyzer 201. As depicted the analyzer 201 comprises a motor 203, a fan, and a cyclone. These function together to create a vacuum to pull product into the analyzer. The use of a cyclone provides for a greater vacuum which results in a faster filling of the analyzer 201. This in turn, allows for faster analysis providing for a greater number of tested samples. In operation, when the analyzer 201 requests a sample, the analyzer 201 will power the motor 203 creating a vacuum which will deliver the desired product.

As noted, density is weight over volume. In the embodiment depicted the analyzer comprises a cup 204 of a known volume. When this cup 204 is filled with product, the weight of the product within the cup 204 can be measured and the resulting density calculated using the known volume of the cup 204. As depicted, when the analyzer 201 pulls product, product is directed into funnel 207 which directs the product to the cup 204. The cup 204, in some embodiments, is moveable laterally relative to the stationary funnel 207. Note, while a funnel 207 with slanted side walls has been described, this is for illustrative purposes only and should not be deemed limiting. As an example, a funnel with straight walls can also be utilized.

Figure 2A:
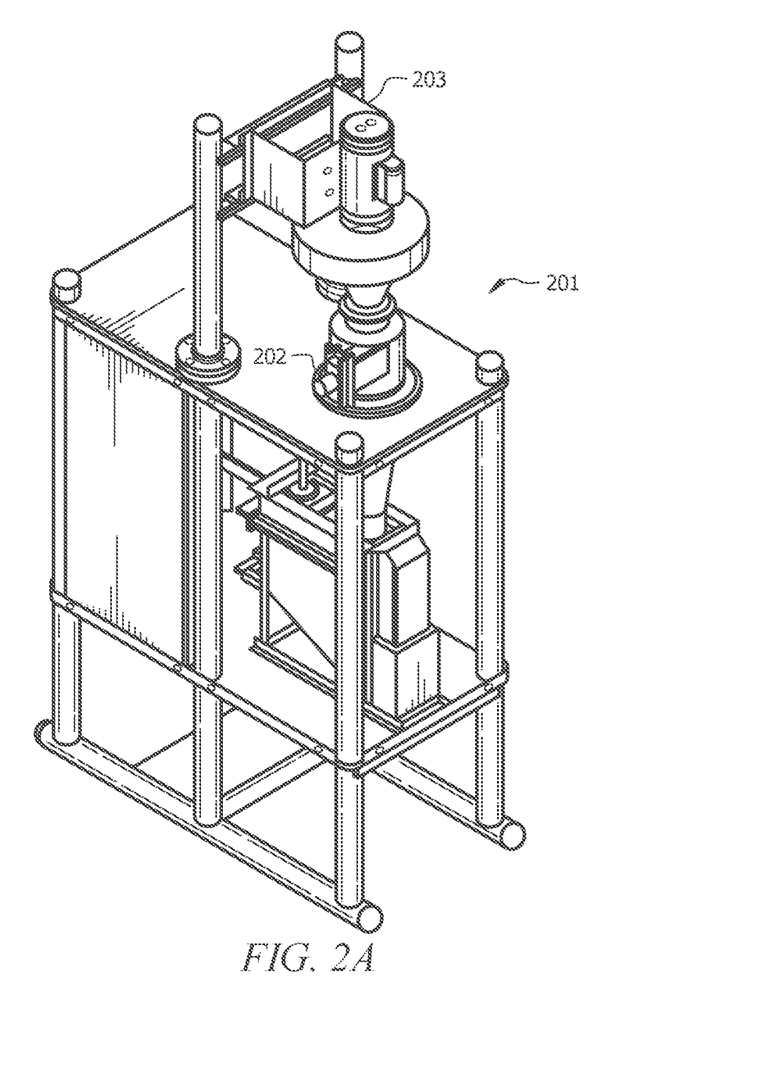
FIG. 2a is a perspective view of the density analyzer in one embodiment.
Figure 2B:
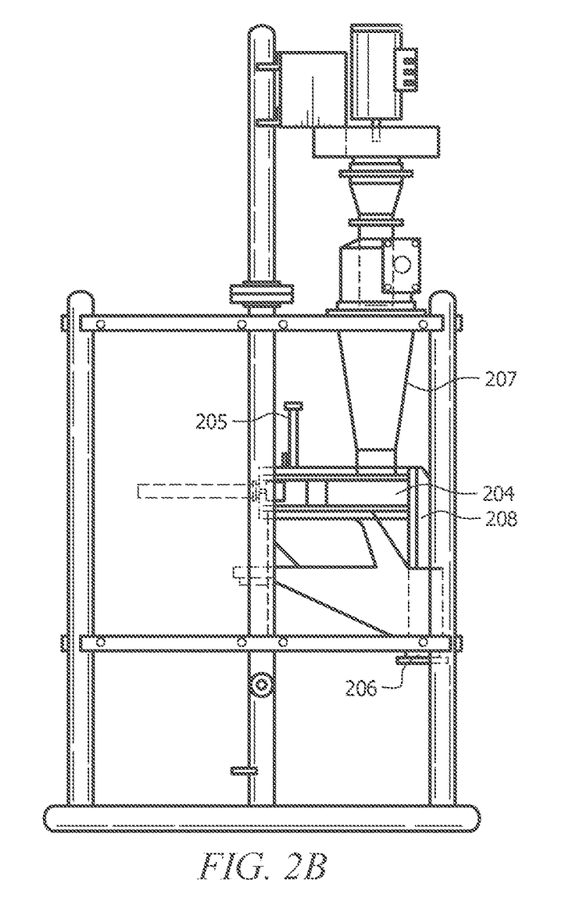
FIG. 2b is a side view of the density analyzer in one embodiment.
Figure 2C:
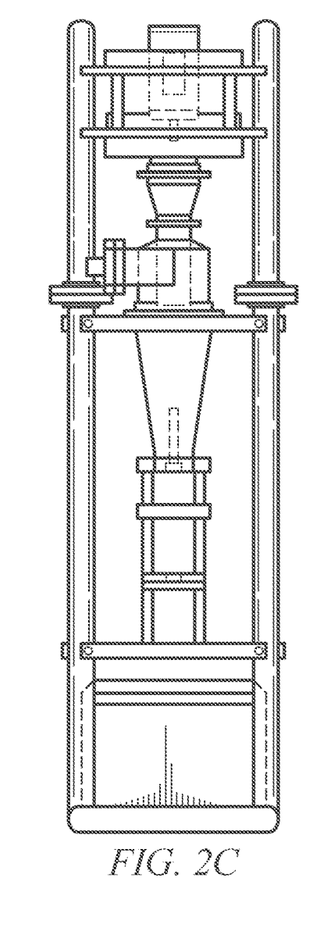
FIG. 2c is a front view of the density analyzer in one embodiment.
Figure 2D:
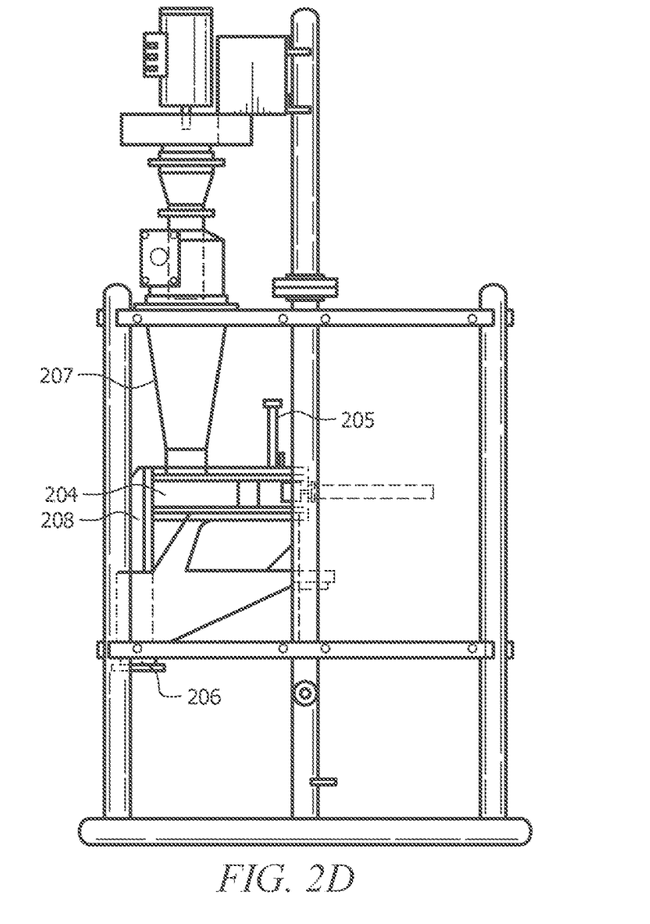
FIG. 2d is a side view of the density analyzer in one embodiment.
Figure 2E:
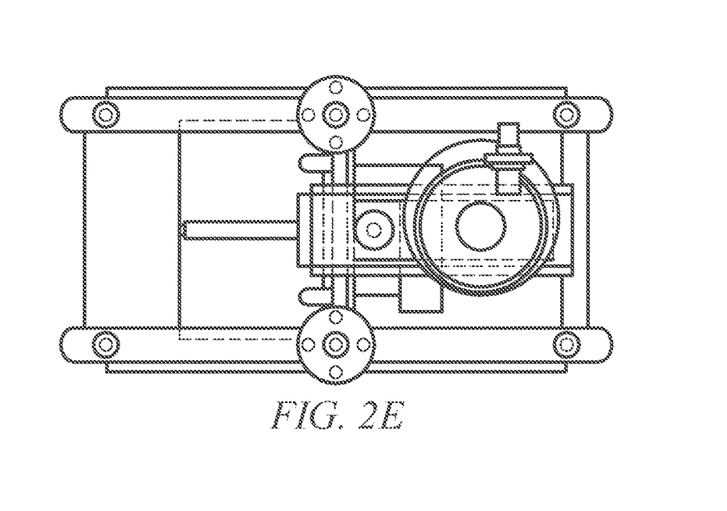
FIG. 2e is a top view of the density analyzer in one embodiment.

FIG. 2b is a side view of the analyzer 201. FIG. 2b shows the cup 204 in the discharge position. In the discharge position, the cup 204 is not directly aligned with the funnel 207 but is instead offset from the funnel 207. As depicted, the cup 204 is moved horizontally relative to the funnel 207. When the cup 204 were aligned vertically with the funnel 207 the cup 204 is in the fill position. The cup 204 can be moved laterally relative to the funnel 207 via any method or device known in the art. In one embodiment the cup 204 is vertically adjacent during the fill position but is moved down vertically in the discharge position.

When in the fill position, the cup 204 is receiving product from the funnel 207. Product falls from the funnel 207 into the cup 204. When the cup 204 is filled, product accumulates in the funnel 207. The weight of the product helps ensure that the cup 204 is properly filled and that air gaps and product bridges within the cup 104 are minimized. Air gaps and product bridges prevent the cup 204 from being properly filled and therefore results in an improper density calculation. In one embodiment the analyzer 201 comprises a shaking device which applies a shaking or vibration force upon the cup 204 to assist in the filling of the cup 204. In other embodiments, no separate shaking or vibration mechanisms are utilized.

In one embodiment the funnel 207 comprises a level indicator (not depicted), pressure sensor, or other indicator which ensures excess product is located in the funnel 207. These sensors ensures that excess product has been received and that the cup 204 is properly filled before moving the cup 204. In other embodiments, however, the analyzer 201 directs product to the cup 204 for a specified amount of time which is deemed sufficient for the cup 204 to have been filed. Regardless of the method for ensuring the cup 204 is filled, afterwards the cup 204 is moved from the fill position to the discharge position. A leveler 208 scrapes along the top of the cup 204 and removes any product which is not within the cup 204. In one embodiment the level is stationary and does not move, but the cup 204 moves relative to the leveler such that the leveler scrapes any product above the top of the cup 204.

In one embodiment the cup 204 comprises a moveable bottom. Thus, after the top of the cup 104 has been leveled, and the cup 204 is in the discharge position, the bottom of the cup 204 opens to allow product to fall downward out of the cup 204. In other embodiments, the cup 204 does not comprise a bottom, and when the cup 204 is moved to the discharge position there is a void in the floor bottom which allows product to flow. In either embodiment, product exits the cup 204 at the discharge position.

In one embodiment, and as depicted, the analyzer 201 comprises a plunger 205. A plunger 205, as used herein, is a mechanism which applies force to ensure all of the product is removed from the cup 204. The plunger 205 can comprise a mechanical plunger which enters the cup 204 to physically force any remaining product out of the cup 204. In other embodiments the plunger 205 comprises an air nozzle which uses a burst of air to ensure product is removed from the cup 204. Ensuring that all product is removed from the cup 204 results in a more accurate density calculation.

The product removed from the cup 204 is then weighed on a scale 206. Virtually any scale 206 known in the art can be utilized. After the scale 206 has determined the weight of the sample, the product is then dumped from the scale 206. In one embodiment the analyzer 201 comprises an air nozzle to blow and clear product from the scale 206 to ensure a proper measurement for the subsequent sample. The discarded sample can then be returned to the finished flake storage container or simply discarded. Thereafter, the analyzer 201 will collect an additional sample, and the process is repeated.

Once the weight of a sample is determined, the system uses the known volume of the cup 204 to calculate the density. If the density is in the desired range, then no adjustments are deemed necessary. If, however, the density is out of range, then the PLC determines which adjustments, if any, need to be made. In one embodiment, if the density is too high, then the flake is too heavy and thick, and the gap between the rollers needs to be decreased. Conversely, if the density is too low, then the gap between the rollers needs to be increased.

Figure 3:
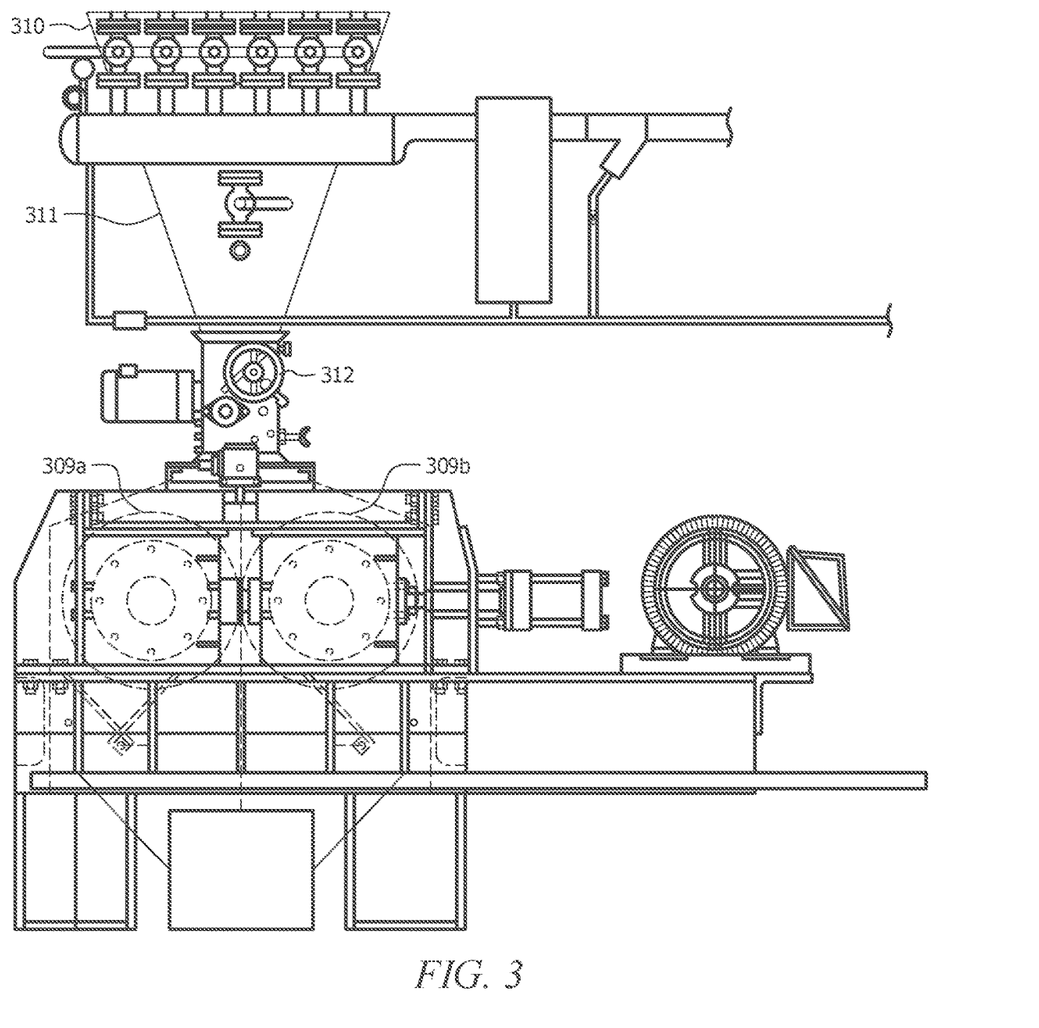
FIG. 3 is a side view of the flaking system in one embodiment.

FIG. 3 is a side view of the flaking system in one embodiment. At the upstream end of the flaking system are a plurality of steam inlets valves 310. As noted, in one embodiment one or more of these steam inlets 310 comprise control valves 310 which can be opened and closed depending upon the determined moisture content. In one embodiment the valves comprise valves which can be partially open. Thus, rather than being fully open or fully closed, the valve can be 45% open, as an example.

Steam is applied and mixed in a steam cabinet discussed in more detail below. This mixing ensures a more homogenous mixture. Downstream of the steam cabinet is the roller feeder 312. The roller feeder 312 directs and forces the wet corn to the downstream rollers 309. In one embodiment the roller feeder 312 is a variable speed. Thus, the speed and output of the wet product feed can be adjusted.

As noted, downstream of the roller feeder 312 are the rollers 309. As depicted, and in one embodiment, the rollers 309 comprise two opposing rollers. As previously noted, in one embodiment each pair of rollers has a left set of rollers coupled via an axel to a right set of rollers. In one embodiment, the gap between the rollers is independently adjusted on the left and right side.

As wet corn enters the rollers 309 a pressure is applied to the wet corn. As depicted the front roller 309*a* opposes the back roller 309*b*. The wet corn is pushed and sheared to the gap between the rollers 309. The gap determines the thickness of the flaked corn. A wider gap allows for a thicker flake, whereas a thinner gap provides for a thinner flake.

Figure 4:
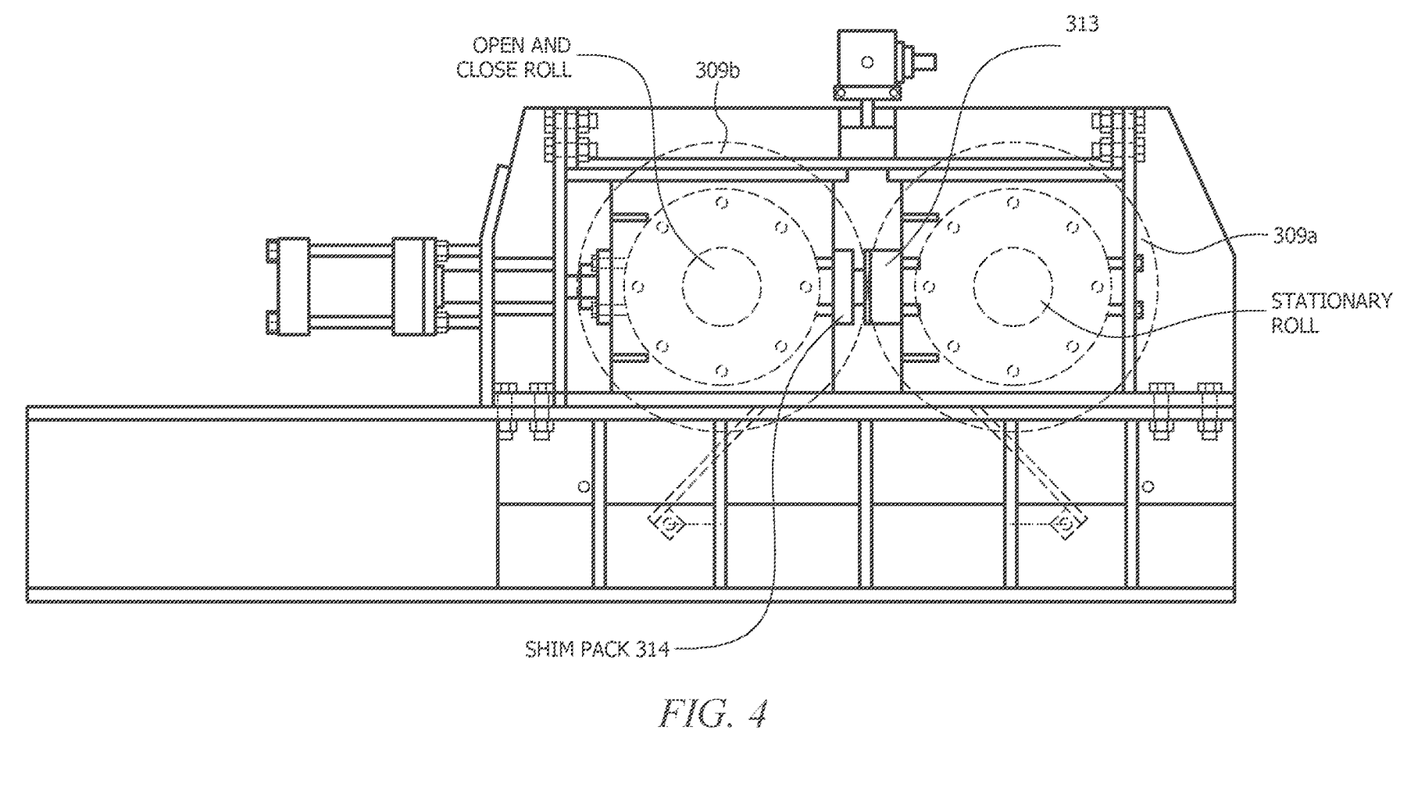
FIG. 4 is a side view of the roller system in one embodiment.

Turning to FIG. 4, FIG. 4 is a side view of the roller system in one embodiment. FIG. 4 is a side view taken from the opposite side as shown in FIG. 3. Thus, the front roller 309*a* is on the right in FIG. 4 as opposed to the left in FIG. 3. In one embodiment one of the rollers is a stationary roller and the other roller is moveable laterally relative to the stationary roller. In the embodiment depicted, the front roller 309*a* is stationary whereas the back roller 309*b* can move relative to the front roller 309*a*.

The fixator 313 is a device which moves the moveable roller to set the gap. Previous attempts included a threaded device which matches with a gear. When the thread was manually turned, the moveable roller was advanced relative to the stationary roller. One downside to this approach is that often the pressure from the roller feeder 312 overpowers the pressure on the thread, causing the gap to undesirably increase. This results in an unacceptable flake thickness and density. In response, the operator then had to decrease the feed rate and adjust the fixator. In practice, this resulted in a constant game of reacting to the moisture content, gap thickness, flake thickness, etc. This required constant adjustments by the operator and resulted in non-uniform final flakes.

Accordingly, in one embodiment the fixator comprises an adjustable fixator with a linear indicator and pressure transducer. In one such embodiment, the adjustable fixator comprises a hydraulic fixator. An adjustable fixator 313 allows automatic adjustments and allows for compensation of fluctuations in pressure from the roller feeder 312.

As noted, in one embodiment the fixator comprises a pressure transducer and a linear indicator. A pressure transducer reads and interprets the pressure sensed at the rollers 309. If the pressure is outside of an acceptable tolerance, an alarm is generated. In one embodiment, if the pressure is too high, an alarm is generated, and the feed rate from the roller feeder 312 is automatically reduced. This occurs prior to the pressure overpowering the fixator, resulting in an undesirable increasing of the gap.

This logic is a great benefit because the fixator 313 and the roller feeder 312 are now in communication with one another. Accordingly, the feeder 312 will not overpower the fixator 313 resulting in the production of thicker than desired flakes. Instead, when the pressure transducer realizes that the pressure supplied by the hydraulics is about to be overtaken by the feeder 312, the PLC directs the feeder 312 to slow down, decreasing the pressure.

Additionally, the pressure transducer monitors what pressure is required to obtain a certain thickness. If the analyzer 201 determines the flakes are too thick, the PLC can direct the fixator 313 to extend the hydraulics by the required distance. In some embodiments the hydraulics are extended by increments as small as 1/16 of an inch. Likewise, if the analyzer 201 determines the flakes are too thin, the fixator 313 can be directed to increase the gap.

As depicted, the fixator 313 further comprises a shim pack 314. As depicted, this on the moveable roll. The shim pack 314 is a replaceable block, or series of blocks, which makes physical contact with the hydraulic fixator 313. Due to the contact, the shim pack 314 may wear with time. Thus, in one embodiment the shim pack 314 is replaceable.

In one embodiment, these adjustments occur in real-time. As noted, in some embodiments the density of a sample from a left side of a first flaker, for example, is analyzed. Determining on the result, the associated fixator can be adjusted as required. Likewise, a subsequent sample from the right side of the first flaker can dictate an adjustment for the fixator associated with the right side. The same process continues for the second, third, etc. flakers, and then is repeated. Thus, the fixator 313 can be adjusted depending upon the results from the density analyzer 201. As noted, the fixator 313 and/or the feed rate can also be automatically adjusted depending upon the pressure determined from the pressure transducer. The roller feed 312 can be automatically adjusted when deemed necessary because of the sensed pressure.

As noted, in one embodiment the fixator comprises a linear indicator. This allows the hydraulic system to convert the signal to and/or from the PLC into a linear measurement.

Thus, if the hydraulic needs to be adjusted by 1/16 of an inch, the linear indicator makes that conversion.

It should be noted that while a hydraulic fixator 313 has been described, this is for illustrative purposes only and should not be deemed limiting. The fixator can comprise virtually any system which can apply a variable and controlled force. This includes hydraulic as well pneumatic, and other similar systems.

Figure 5A:
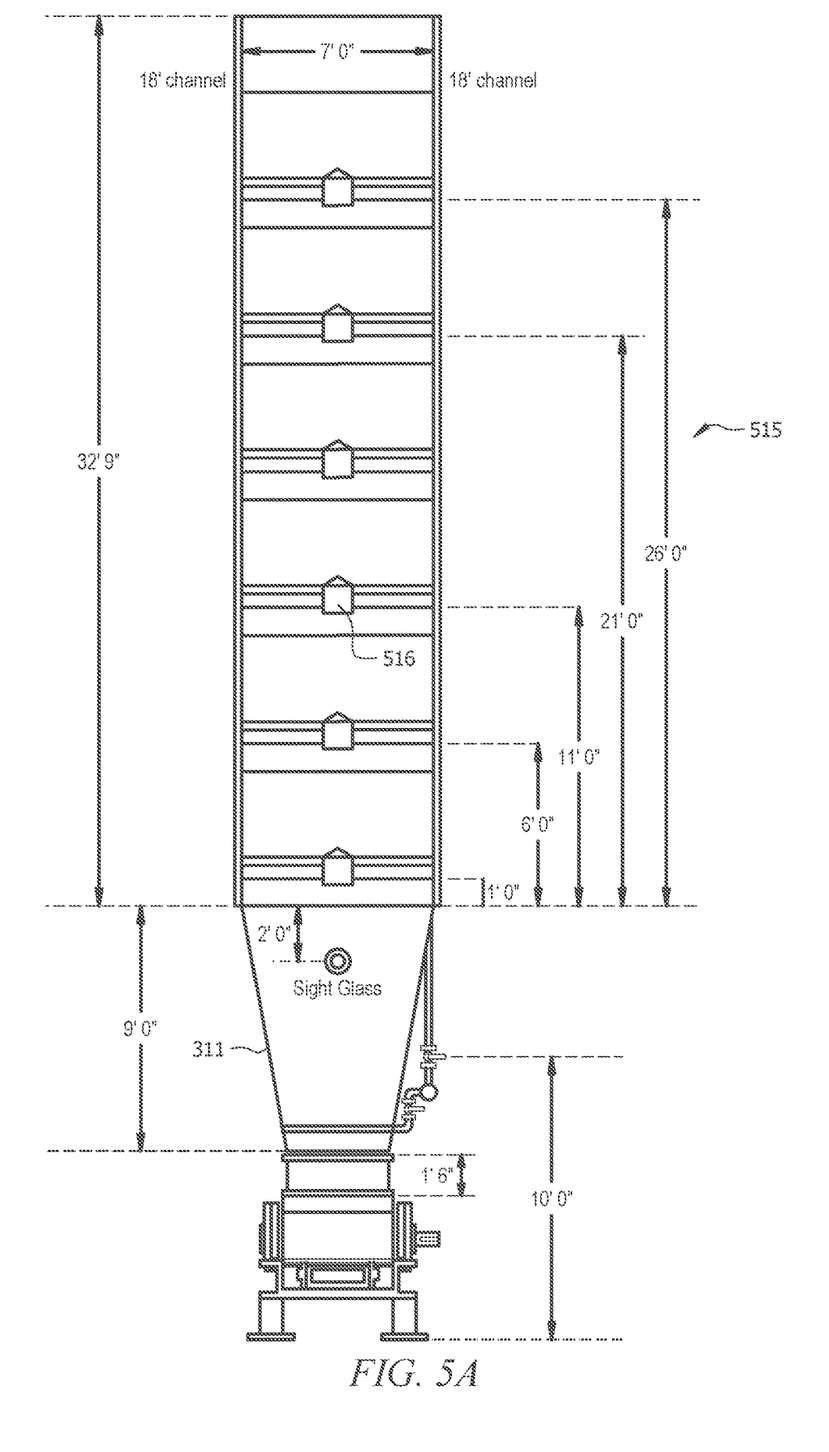
FIG. 5a is a side view of a steam cabinet in one embodiment.
Figure 5B:
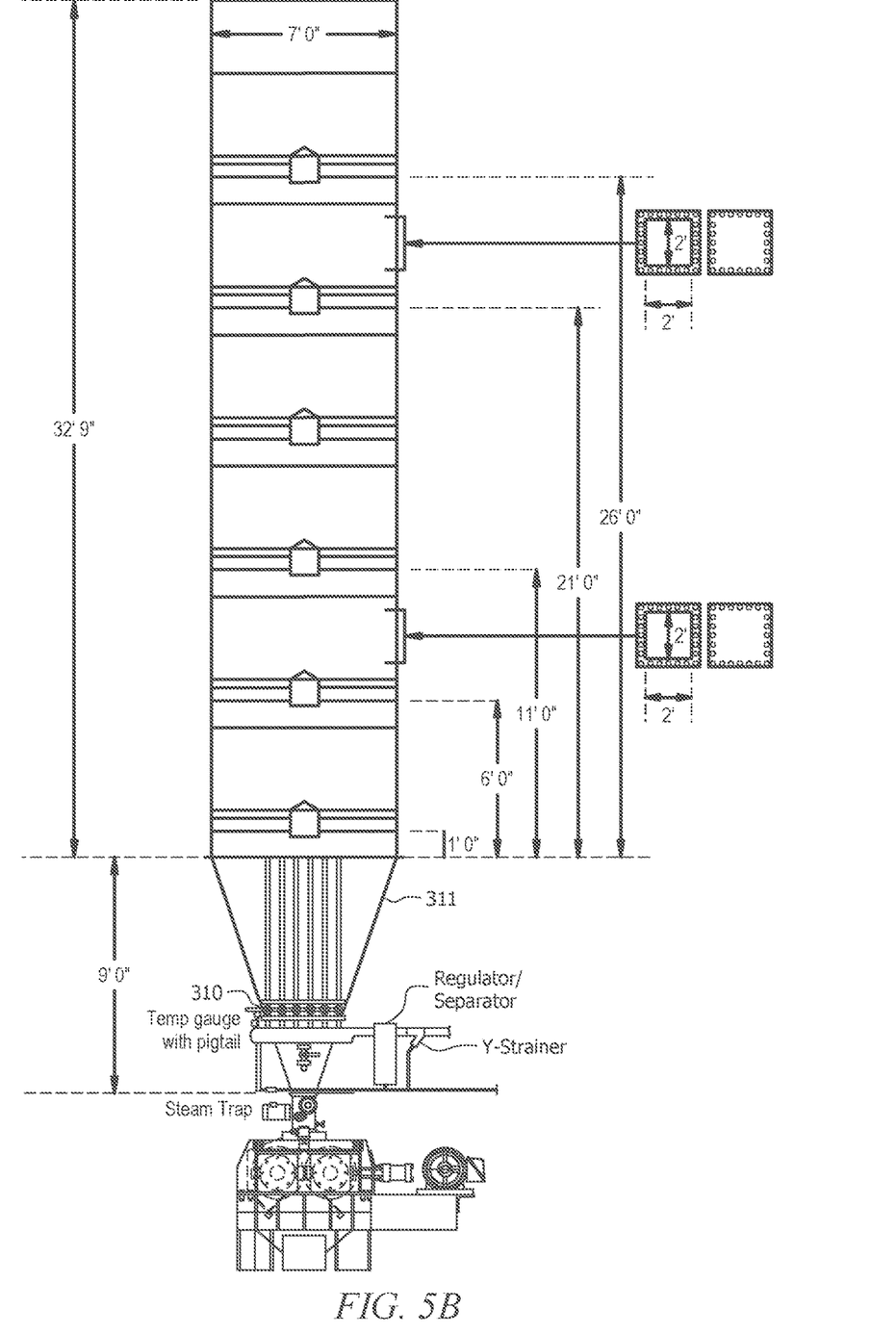
FIG. 5b is a side view of a steam cabinet in one embodiment.
Figure 5C:
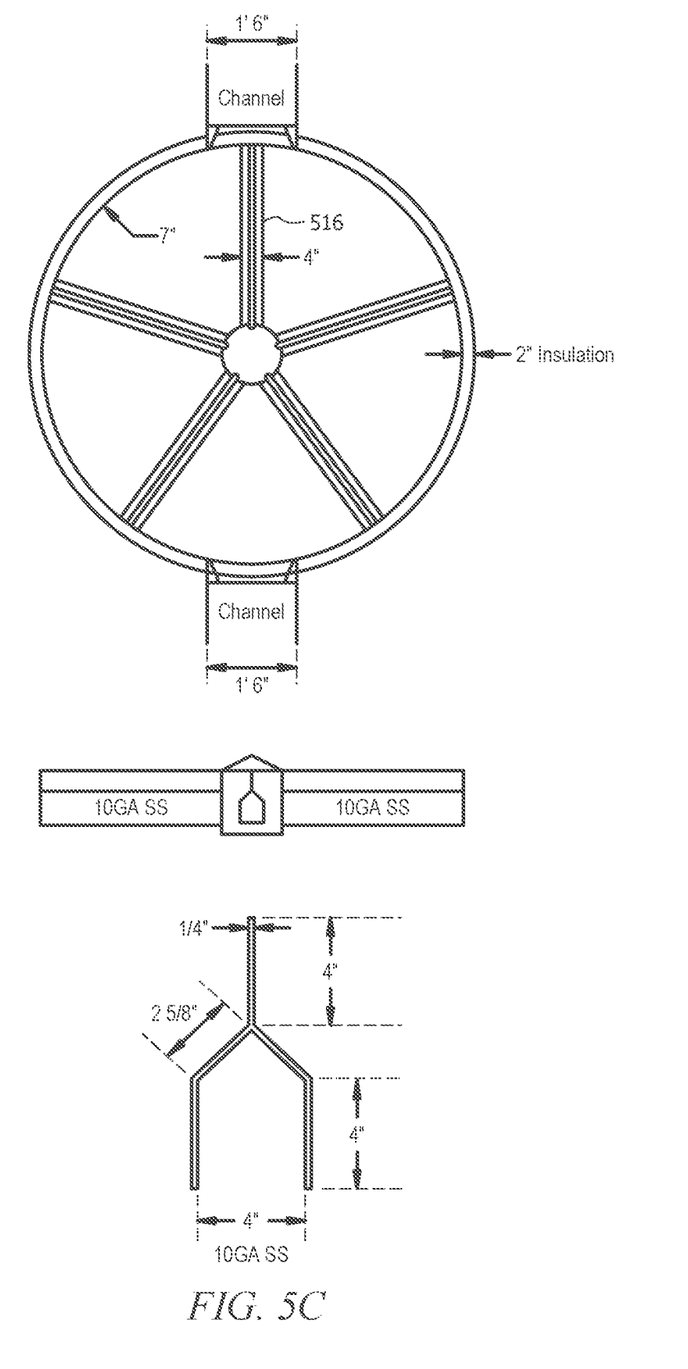
FIG. 5c is a top view of a steam cabinet in one embodiment.

FIG. 5 shows various views of a steam cabinet in one embodiment. As depicted, the vertical cabinet provides sufficient surface area and time for the dry corn to be introduced with steam and cook to the desired temperature. In the cabinet dry corn is introduced at the top and allowed to gravity feed and move to the bottom of the cabinet 515. The transition 311, as discussed above, transitions from the often circular cross-section of the cabinet 515 to the generally rectangular cross-section of the roller feeder 312. Note, these cross-sections are illustrative purposes only and should not be deemed limiting.

As depicted, the cabinet comprises six steam sparges 514. The sparge 514 is illustrated in FIG. 5c which shows a top view of the cabinet 515. As shown the cabinet 515 has a circular cross-section. The sparge 516 has a central hub and five spokes connected by an outer ring. Steam is directed into the central hub and distributed to the spokes and outer ring. This results in increased distribution surface area, promoting steam distribution and heat transfer.

In one embodiment the each steam inlet 310 is in fluid communication with a single steam sparge 516. In this manner, the amount of steam to each sparge 516 can be independently controlled by the PLC. This allows the temperature profile within the steam cabinet 515 to be monitored and controlled.

In one embodiment, and as depicted, the steam cabinet 515 has a plurality of temperature sensors located throughout the steam cabinet 515. This allows the temperature profile within the steam cabinet 515 to be monitored and controlled by adjusting the steam inlet 310.

Typically, temperature sensors are inserted at various locations of the steam cabinet 515. However, steam cabinets are often large and can have diameters of 10 feet or more. Thus, while a temperature sensor which extends six inches from the side of a steam cabinet 515 provides a temperature reading, it does not provide an accurate reading profile of the temperature within the cabinet. As an example, it does not indicate if the internal temperature is the same as the recorded temperature near the outer shell of the cabinet 515. Accordingly, in one embodiment a cable or series of cables which include a plurality of temperature sensors are inserted into the cabinet 515. This allows a more accurate reading of the temperature profile within the cabinet 515. In one embodiment the cable comprises a plurality of temperature sensors spaced along the length of the cable, separated by a between about 6 inches and 2 feet. In one embodiment they are separated by a foot. In one embodiment the cable extends for the majority of the length of the steam cabinet. In one embodiment the cable is distributed throughout the cabinet, along the periphery, through the center, etc. to provide for an accurate reading throughout the entire cabinet. Based on the plurality of readings, a 3D temperature profile can be compiled. Based on the readings, the operator may determine that a particular zone is not reaching the desired temperature. The operator can then modulate the inlet valves 310 accordingly to ensure a more uniform temperature profile. As an example, the temperature profile may indicate that the top zone is too cold whereas the bottom zone is too hot. Thereafter, the PLC can direct the steam inlet 310 associated with the top zone to open and the steam inlet 310 associated with the bottom zone to close, or partially close.

The temperature system discussed above will result in a more tightly controlled temperature profile. This allows the flaking system to ensure that the corn is fully gelatinized. This results in the final flakes having a more uniform and consistent properties as well as yielding a more superior product.

As noted, in one embodiment the temperature control and profile is automatically monitored and adjusted in real-time. Thus, if a zone is too cold the control valves are automatically adjusted as needed to ensure a proper temperature is obtained. Further, because the flow rate of the downstream roller feeder 312 can alter the residence time of the product within the cabinet 515, the PLC can adjust the steam inlets 310 as necessary when the feed rate of the roller feeder 312 is altered or changed.

There are many advantages of the system and method discussed herein. First, the system and method results in a more uniform produced final flake. Because minor adjustments can be made real-time, the amount of product produced outside of the acceptable tolerance is reduced or eliminated. Thus, a superior product is produced.

Additionally, because density is calculated on an obtained weight and a known volume, the actual density is obtained. This is an advantage over prior art attempts which simply calculate a theoretical density based on amps or loads of the flakers. As noted, due to the many different variables which can alter the amps or load of the flakers, including but not limited to the feed rate, calculating and determining an actual density results in more accurate thickness determination. This in turn allows for more accurate adjustments to the gap distance.

An additional benefit of the automation is the reduced labor required to produce a flaked product. As noted, previously the operator was constantly chasing moisture content, feed rate, thickness, gap size, etc. One adjustment changed other variables such that the operator's constant attention was required. Now, the desired density, moisture content, and rate can be entered into the system. Thereafter, the system automatically adjusts steam, automatically reads samples in the density analyzer 201, and automatically adjusts the fixator 313 and feed rate from the roller feeder 312 to ensure a constant and uniform product is produced. The operator who previously could only monitor a single flaker can now oversee two or more flakers. Thus, labor cost is reduced.

Another benefit in automation is increased safety. Because the operator is not manually moving all valves, but is instead generally watching the process through a computer, the safety of the operator is increased.

An additional benefit is the ability to monitor and log data related to the various components. Thus the amps on motors and bearing temperatures are recorded, among other items. This is useful in aiding in preventative maintenance as well as maintenance and troubleshooting. The system also tracks and logs hours used on various motors and other equipment. Finally, the system tracks flow rate, density, temperatures, etc. which allow these variables to be optimized to increase and maximize yield.

While the invention has been particularly shown and described with reference to a preferred embodiment, it will be understood by those skilled in the art that various changes in form and detail may be made therein without departing from the spirit and scope of the invention.

What is claimed is:

1. A system for flaking, said system comprising:
a stationary roller;
a moveable roller;
a roller feeder, wherein said roller feeder is upstream of said stationary roller and said moveable roller;
an adjustable fixator;
wherein said adjustable fixator comprises a linear indicator, and wherein said adjustable fixator is hydraulic;
a program logic controller (PLC) which directs said roller feeder and said adjustable fixator;
wherein said linear indicator converts a signal from said program logic controller (PLC) into a linear measurement;
wherein said roller feeder is in communication with said linear indicator such that said adjustable fixator and said roller feeder can be automatically adjusted in real-time in response to said linear indicator.

2. The system of claim 1 further comprising a steam cabinet upstream from said rollers.

3. The system of claim 1 further comprising a density analyzer downstream from said rollers, and wherein said density analyzer is in communication with said adjustable fixator to adjust said adjustable fixator based on said density analyzer.

4. The system of claim 3 wherein said density analyzer receives a sample from said rollers, and wherein said system weighs a sample in a container with a known volume to calculate an actual density.

5. The system of claim 1 wherein said adjustable fixator applies a force on said moveable roller.

* * * * *